(12) United States Patent
Kuebel

(10) Patent No.: US 8,857,036 B2
(45) Date of Patent: Oct. 14, 2014

(54) LEAK-TIGHT CONNECTION BETWEEN PIPE AND PORT

(75) Inventor: Christoph Kuebel, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 349 days.

(21) Appl. No.: 13/041,770

(22) Filed: Mar. 7, 2011

(65) Prior Publication Data

US 2012/0228869 A1 Sep. 13, 2012

(51) Int. Cl.

| B21D 39/00 | (2006.01) |
|---|---|
| B21D 39/08 | (2006.01) |
| B21D 39/20 | (2006.01) |
| F16L 25/00 | (2006.01) |
| F16L 13/14 | (2006.01) |

(52) U.S. Cl.
CPC .................................. *F16L 13/147* (2013.01)
USPC ............... 29/523; 29/522.1; 29/521; 29/507; 285/258; 285/329; 285/382.4; 285/382.1; 285/382.5; 72/393; 72/370.06; 72/370.08

(58) Field of Classification Search
USPC ............ 29/507, 523, 522.1, 505, 506, 521; 285/222, 382.4, 905, 258, 423, 329, 285/351, 382.1, 382.5; 72/370.05, 370.06, 72/370.08, 392, 393
See application file for complete search history.

(56) References Cited

U.S. PATENT DOCUMENTS

| 2,252,274 | A | * | 8/1941 | Rossheim et al. | ......... 285/382.4 |
|---|---|---|---|---|---|
| 2,459,808 | A | * | 1/1949 | Geyer | .................. 72/392 |
| 2,587,522 | A | * | 2/1952 | Pilkington, Jr. | ................. 267/52 |
| 3,290,770 | A | * | 12/1966 | Silverman et al. | ........... 29/421.1 |
| 3,787,945 | A | * | 1/1974 | Pasek et al. | ............. 29/890.044 |
| 3,982,778 | A | | 9/1976 | Spencer et al. | |
| 4,319,472 | A | * | 3/1982 | Martin | ............................ 72/122 |
| 4,330,144 | A | * | 5/1982 | Ridenour | ................... 285/382.5 |
| 4,450,618 | A | * | 5/1984 | Ridenour | ........................ 29/509 |
| 4,593,729 | A | * | 6/1986 | Tamra | ........................... 141/218 |
| 4,597,282 | A | * | 7/1986 | Hogenhout | ................ 72/370.08 |
| 4,888,975 | A | * | 12/1989 | Soward et al. | .................. 72/392 |
| 5,224,256 | A | * | 7/1993 | Haglund | ........................ 29/523 |
| 5,335,729 | A | * | 8/1994 | Turner et al. | .................. 166/380 |
| 5,833,280 | A | * | 11/1998 | Ferlin et al. | .................... 285/330 |
| 5,964,023 | A | * | 10/1999 | Simpson et al. | ................ 29/511 |
| 5,967,568 | A | * | 10/1999 | Bird | .............................. 285/258 |
| 6,131,265 | A | * | 10/2000 | Bird | ............................... 29/507 |
| 6,286,213 | B1 | * | 9/2001 | Hada et al. | .............. 29/890.044 |
| 6,446,323 | B1 | * | 9/2002 | Metcalfe et al. | ................ 29/523 |
| 6,698,517 | B2 | * | 3/2004 | Simpson et al. | ............. 166/277 |
| 7,146,702 | B2 | * | 12/2006 | Cook et al. | ....................... 29/507 |
| 7,363,691 | B2 | * | 4/2008 | Cook et al. | ....................... 29/523 |
| 8,020,272 | B2 | * | 9/2011 | Ghiran et al. | ................ 29/421.1 |
| 8,056,208 | B2 | * | 11/2011 | Karoliussen | .................... 29/523 |
| 8,161,620 | B2 | * | 4/2012 | Ficker et al. | .................... 29/508 |

(Continued)

FOREIGN PATENT DOCUMENTS

| DE | 19543103 A1 | 10/1996 | | |
|---|---|---|---|---|
| GB | 2079204 A | * 1/1982 | ............. | B21D 39/06 |
| WO | WO 2007055353 A1 | * 5/2007 | ............... | B28D 1/14 |

*Primary Examiner* — Essama Omgba
(74) *Attorney, Agent, or Firm* — Dinsmore & Shohl LLP

(57) ABSTRACT

A method of forming a leak tight connection between a pipe and a port made of different metals is described. A leak tight connection between a pipe made of a first metal and a port made of a second metal is also described.

12 Claims, 2 Drawing Sheets

(56) References Cited

U.S. PATENT DOCUMENTS

| | | | |
|---|---|---|---|
| 8,474,131 B2* | 7/2013 | Karoliussen | 29/757 |
| 8,511,133 B1* | 8/2013 | Chen | 72/393 |
| 2001/0045284 A1* | 11/2001 | Simpson et al. | 166/313 |
| 2002/0112338 A1* | 8/2002 | Metcalfe et al. | 29/523 |
| 2007/0107195 A1* | 5/2007 | Stephenson et al. | 29/505 |
| 2007/0289954 A1* | 12/2007 | Bien et al. | 219/121.46 |
| 2008/0256778 A1* | 10/2008 | Ghiran et al. | 29/505 |
| 2008/0303277 A1* | 12/2008 | Yamashita et al. | 285/382.5 |
| 2010/0319427 A1* | 12/2010 | Lohbeck | 72/54 |
| 2013/0174404 A1 | 7/2013 | Bonnot | |

* cited by examiner

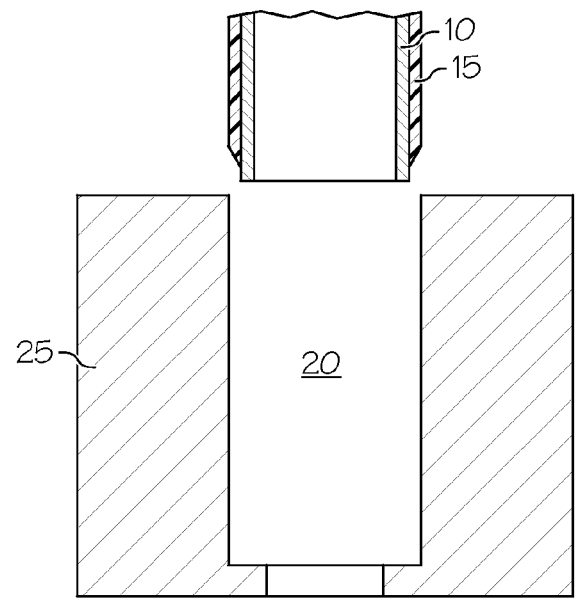
FIG. 1
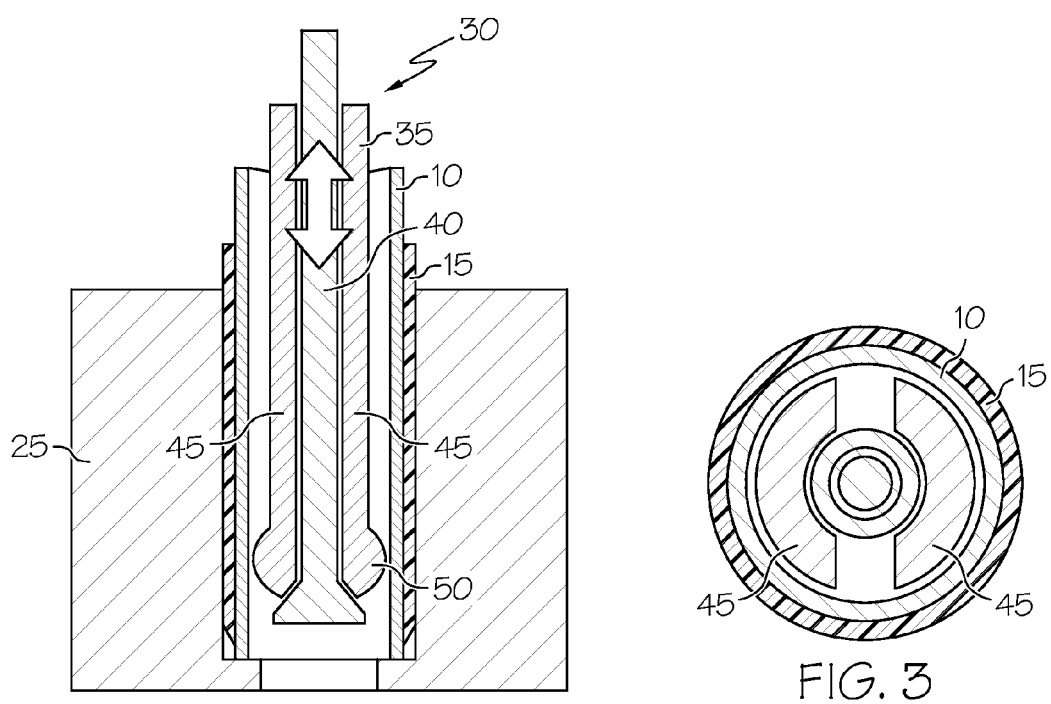
FIG. 2
FIG. 3

LEAK-TIGHT CONNECTION BETWEEN PIPE AND PORT

BACKGROUND OF THE INVENTION

The invention relates generally to connections between pipes and ports, and more particularly to leak-tight connections between pipes and ports without screw threads.

Many components in a variety of applications are made of stainless steel. For example, the valves, pipes, and accessories for some currently available hydrogen tank systems are made of stainless steel. However, stainless steel is expensive, and it would be desirable to replace it with a lower cost material, such as aluminum, where possible. It is not feasible to replace all parts with aluminum, and some parts will remain stainless steel.

As a result of the replacement of stainless steel with other metals in some components, connections need to be made between parts made of different materials, such as stainless steel and aluminum. One problem with such connections is that seizing can occur when stainless steel clamp collar fittings are screwed into an aluminum port. In addition, crevice corrosion can develop between the two different metals in the presence of water, which might splash or be condensed between them.

SUMMARY OF THE INVENTION

One aspect of the invention is a method of forming a leak tight connection between a pipe and a port made of different metals. In one embodiment, the method includes inserting the pipe positioned in a plastic grommet into an opening in the port, the pipe being made of a first metal and the port being made of a second metal; inserting a tool into the pipe, the tool comprising an expandable portion and an inner wedge capable of increasing a diameter of the tool; rotating the tool in the pipe and increasing the diameter of the tool using the inner wedge, the increased diameter of the tool increasing the diameter of the pipe and forming a first seal between the pipe and the port at a first position in the pipe; and removing the tool from the pipe.

Another aspect of the invention is a leak tight connection between a pipe made of a first metal and a port made of a second metal. In one embodiment, the leak tight connection includes a first seal between the pipe and the port, a plastic grommet surrounding the pipe, the pipe positioned in an opening in the port, the pipe having an initial diameter, the pipe having an increased diameter at the first seal compared to the initial diameter, the pipe being in contact with the port at the first seal.

BRIEF DESCRIPTION OF THE INVENTION

FIG. 1 is a cross-section of the pipe with the plastic grommet before insertion into the port.

FIG. 2 is a cross-section of the pipe with the grommet inserted into the port with the tool inserted.

FIG. 3 is a top plan view of the port with the pipe, grommet, and tool.

DETAILED DESCRIPTION OF THE INVENTION

A leak tight connection is provided between a pipe and a port made of different materials without using screw threads. The connection provides galvanic isolation between the pipe and the port to avoid crevice corrosion. The connection allows stainless steel screw-in connections to be replaced, reducing the cost of the connections.

Figure 4:
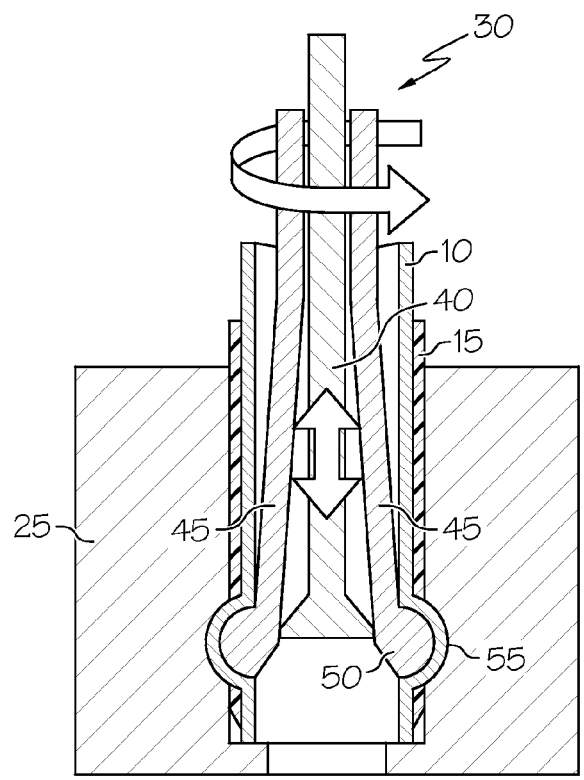
FIG. 4 is a cross-section of the port with the pipe inserted and the tool activated.
Figure 5:
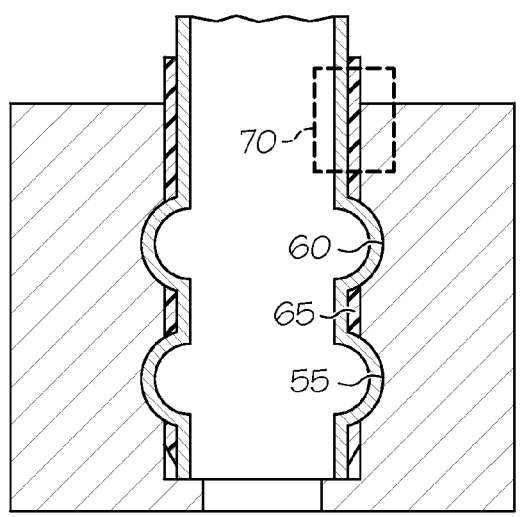
FIG. 5 is a cross-section of the connection formed.

The method of connecting the pipe and port made of different materials is shown in FIGS. 1-5. The pipe 10 to be inserted is provided with a plastic grommet 15 on the outside. The plastic grommet can be made of any suitable plastic material including, but not limited to, elastomerics or thermoplastics.

The pipe 10 and grommet 15 are inserted into the opening 20 in the port 25, e.g., a stainless steel pipe and an aluminum port. A widening tool 30 is inserted into the opening in the pipe 10. The widening tool 30 is designed so that it can be inserted into and removed from the pipe easily, and so that it can be expanded in size while in the pipe.

In one embodiment, the widening tool 30 includes at least one expandable portion 35 and an inner wedge 40. In one embodiment, the expandable portion is a split tubular stiffener comprising two (as shown) or more tubular portions 45 positioned around the inner wedge. The widening tool can be made of high alloyed tool steel, for example. One way to manufacture the split tubular stiffener is to manufacture a tubular piece, and cut through the tubular wall at least once, and typically two or more times. The cuts should not be longer than about two third of the stiffener's total length. The split tubular portions generated in this way are connected to the remaining tubular section of the stiffener where there are no cuts.

In one embodiment, the tubular portions 45 have projections 50 on the end. The projections can have any suitable shape, such as semicircular, or triangular.

In one embodiment, the inner wedge 40 is a tubular or rod-like piece with a portion on the end which has a larger diameter than the rest. The larger diameter portion can be in the form of a truncated cone with the wider end at the bottom.

In this arrangement, pulling up on the inner wedge 40 pushes the pair of tubular portions 45 outward, expanding the end of the tool. Thus, the diameter of the tool is greater when it is expanded than when it is not expanded. Other designs for the widening tool are possible. Examples include, but are not limited to, more than two tubular portions, omitting the projections on the expandable portion, or making the inner wedge a different shape.

The tool 30 is expanded and rotated inside the pipe 10, which remains stationary. The diameter of the tool increases, and the increased tool diameter expands the pipe and forms the seal 55. In the area of the seal, the plastic deforms under the pressure caused by the increased pipe diameter. In some cases, plastic will remain between the two metal surfaces and form part of the seal (port/plastic/pipe). Alternatively, all of the plastic could be squeezed out, and a metallic seal generated (port/pipe).

In one embodiment, the tool 30 is rotated inside the pipe while the cone is pulled. In this case, the inner shape of the pipe's widening will be equal to the tool's outer shape. The peripheral speed of the cone should be slightly different from the speed of the tool's inner surface in order to minimize the forces required to pull the cone. However, the difference should be kept as small as possible to avoid excessive wear on the cone and the tool.

In another embodiment, the tool 30 is rotated inside the pipe and pushed up and down at the same time. The cone is also pulled, either continuously or step by step. Using this method, the resulting inner shape of the pipe's widening will be a rounded rectangle.
}

With either method, there should be a peripheral-speed-difference of the surfaces in direct contact with each other (tool to pipe and cone to tool) to minimize the forces required while the pipe is widened. The required forces and the maximum pipe thickness can be determined for each application.

The procedure can be repeated a distance away to create a second seal 60 spaced from the first seal 55. The two seals 55, 60 are separated by a plastic seal 65 made of the compressed plastic grommet 15. The inner wedge 40 is then returned to its initial position, the tool returns to its initial diameter, and the tool 30 is removed from the pipe 10.

Crevice corrosion can be inhibited because the compressed plastic grommet 15 inhibits water intrusion and electrically isolates the pipe 10 and the port 25 in the area 70 when water (electrolyte) occurs.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of forming a leak tight connection between a pipe and a port made of different metals, the method comprising:
   inserting the pipe positioned in a plastic grommet, into an opening in the port, the pipe being made of a first metal and the port being made of a second metal;
   providing a tool, the tool comprising an expandable portion and an inner wedge capable of increasing a diameter of the tool, further comprising, as to the expandable portion, a split tubular stiffener comprising a tube having at least one cut along a portion of a length of the tube and a projection on the end;
   inserting the tool into the pipe;
   rotating the tool in the pipe and increasing the diameter of the tool by pulling up the inner wedge whereby the projection engages an inner wall of the pipe, the increased diameter of the tool increasing the diameter of the pipe and forming a first seal between the pipe and the port at a first position in the pipe where the projection engages the inner wall of the pipe; and
   removing the tool from the pipe.

2. The method of claim 1 wherein there are at least two cuts along the portion of the length of the tube.

3. The method of claim 1 wherein the projection is semicircular or triangular.

4. The method of claim 1 wherein the inner wedge has a truncated cone on the end, and wherein the truncated cone pushes the expandable portion outward when the inner wedge is pulled upward.

5. The method of claim 1 wherein the tool is made of tool steel.

6. The method of claim 1 further comprising:
   moving the tool to a second position in the pipe; and
   rotating the tool in the pipe and increasing the diameter of the tool using the inner wedge, the increased diameter of the tool increasing the diameter of the pipe and forming a second seal between the pipe and the port at the second position in the pipe.

7. The method of claim 1 wherein the first metal is stainless steel and the second metal is aluminum.

8. The method of claim 1 wherein rotating the tool in the pipe and increasing the diameter of the tool using the inner wedge are done simultaneously.

9. The method of claim 1 wherein the pipe is stationary while the tool is rotated.

10. The method of claim 1 wherein there is a difference in a peripheral speed between the pipe and the tool.

11. The method of claim 1 wherein there is a difference in a peripheral speed between the inner wedge and the expandable portion.

12. A method of forming a leak tight connection between a pipe and a port made of different metals, the method comprising:
   inserting the pipe positioned in a plastic grommet, into an opening in the port, the pipe being made of a first metal and the port being made of a second metal;
   providing a tool,
   the tool comprising an expandable portion, wherein said expandable portion comprises a split tubular stiffener comprising a tube having at least one cut along a portion of a length of the tube and a projection on the end, and an inner wedge capable of increasing a diameter of the tool;
   inserting the tool into the pipe;
   rotating the tool in the pipe and increasing the diameter of the tool by pulling up the inner wedge whereby the projection engages an inner wall of the pipe, the increased diameter of the tool increasing the diameter of the pipe and forming a first seal between the pipe and the port at a first position in the pipe where the projection engages the inner wall of the pipe, wherein said first seal comprises a compressed plastic grommet sufficient to inhibit water intrusion and electrically isolate the pipe; and
   removing the tool from the pipe.

* * * * *